Patented May 22, 1945

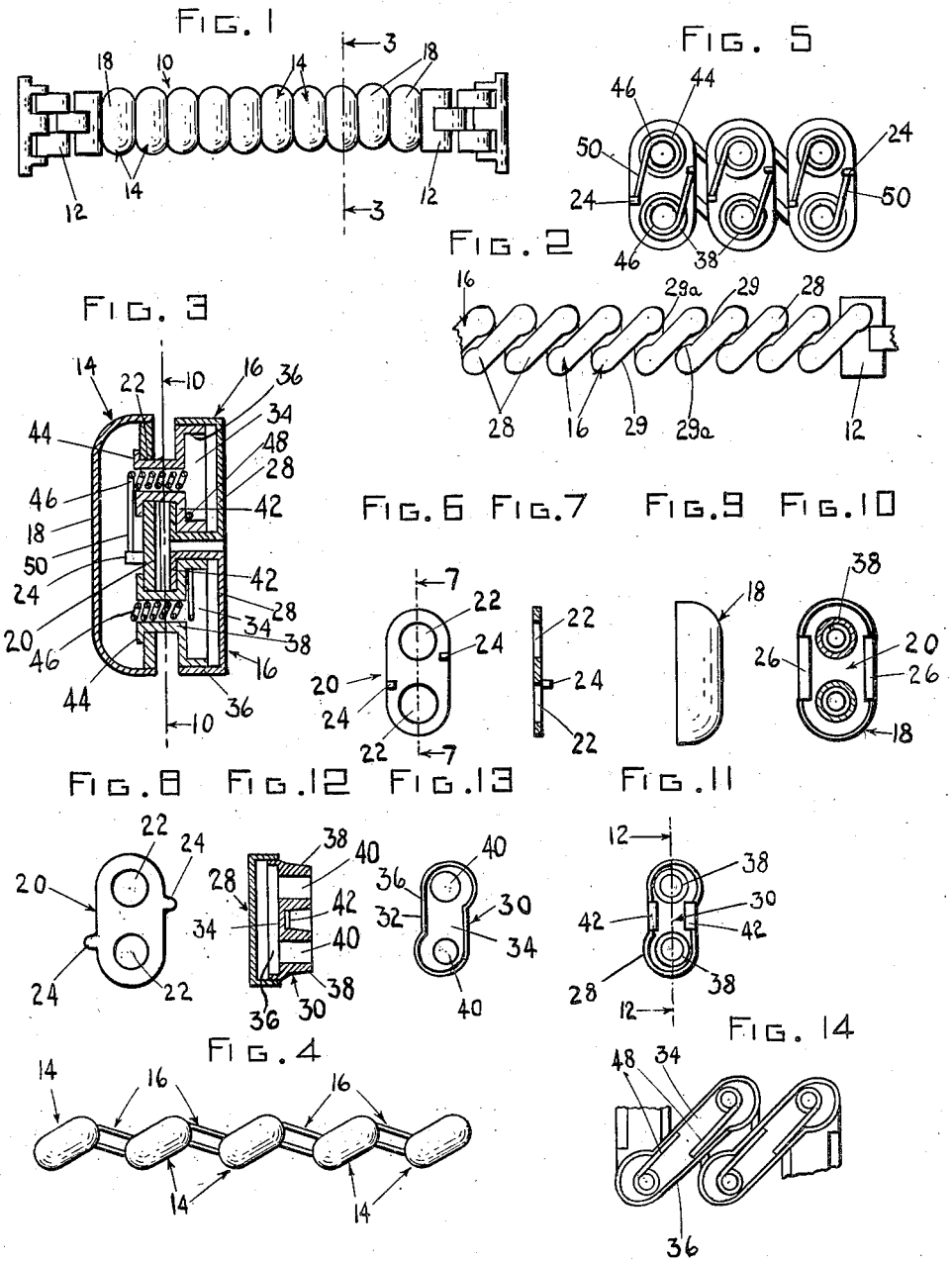

2,376,633

UNITED STATES PATENT OFFICE 2,376,633

EXPANSIBLE WRIST WATCH BAND, BRACELET, OR THE LIKE

Andrew Szeglin, Hempstead, and Jacques Kreisler, New Rochelle, N. Y., assignors to Jacques Kreisler Manufacturing Corporation, North Bergen, N. J., a corporation of New Jersey Application June 26, 1941, Serial No. 399,830

6 Claims. (Cl. 59—79)

This invention relates to expansible chains for articles of personal wear and is intended primarily for use in bracelets or wrist watch straps or bands.

In accordance with the present invention the expansible bracelet or band comprises a plurality of transversely extending links pivotally connected to each other only at their ends and provided with resilient means for holding the links in band-contracting relation and permitting relative movement of said links in band-expanding relation, whereby the band or bracelet is adjustable in size, within certain limits, and can be slipped over the hand in putting the bracelet on or taking it off the wrist without unfastening the ends or other parts without requiring the use of special connecting members. Further, in accordance with one form of the present invention the bracelet or band comprises link members having openings therein at their opposite ends and companion link members provided at their opposite ends with integral tubular pivot pins which pivotally engage said first mentioned link members in said openings thereof for pivotally connecting the adjacent links to each other, said tubular pivot pins serving also as holders for helical springs which resiliently hold the companion links in band-contracting relation. Further, in accordance with the present invention the companion link members are constructed in such manner as to facilitate the securement of the ends of the helical springs thereto.

In the expansible bracelets or bands of the present invention, and in the form thereof wherein the pivotal connections are constituted by tubular pivot pins provided on certain of the link members as referred to above for engagement in openings in companion link members, said link members thus pivotally connected to each other are disposed within companion link members of shell-like construction which may be of various ornamental forms or which may be ornamented in various ways. On the other hand, in other forms of the invention the links are constituted by shell-like members which are pivotally connected to each other by separate pivot pins.

For a more complete understanding of the invention reference is to be had to the following description and to the accompanying illustrative drawing.

In the drawing:

Fig. 1 is a top view of a wrist watch band or bracelet embodying the present invention, in the contracted condition of said band;

Fig. 2 is a bottom view of part of the wrist watch band or bracelet shown in Fig. 1, in the contracted condition of said band, parts of the terminal members of the band being omitted;

Fig. 3 is a transverse sectional view, on an enlarged scale, on the line 3—3 of Fig. 1;

Fig. 4 is a top view of several of the connected links of the band illustrated in Fig. 1, in an expanded condition thereof;

Fig. 5 is a top view, on a larger scale, of several of the connected links of the band shown in Fig. 1, the outer or shell-like members of the top links being removed for the purpose of illustration;

Fig. 6 is a plan view of the inner top link member;

Fig. 7 is a sectional view on the line 7—7 of Fig. 6;

Fig. 8 is a plan view of the link member illustrated in Fig. 6, showing said link member in the condition thereof prior to the bending of the spring-retaining elements;

Fig. 9 is a side view in elevation of the outer top link member;

Fig. 10 is a sectional view on a smaller scale on the line 10—10 of Fig. 3;

Fig. 11 is a top view of one of the bottom links;

Fig. 12 is a sectional view on the line 12—12 of Fig. 11;

Fig. 13 is a bottom view of the inner bottom link member; and

Fig. 14 is a bottom view of several of the connected links of the band illustrated in Fig. 1, the outer or shell-like members of the bottom links being removed for the purpose of illustration.

Referring now to the drawing more in detail, the expansible chain 10 embodying the invention forms part of a wrist watch bracelet or band and for that purpose is connected to the terminal parts 12 of said band by which the latter is attached to the wrist watch. The expansible chain 10 comprises a plurality of top links 14 disposed in side by side relation and extending transversely of the band. Said band also comprises a plurality of bottom links 16, as shown in Fig. 2, disposed in side by side relation and also extending transversely of the band although at a different angle as compared with top links 14. As here shown links 14 are disposed at right angles to the longitudinal line of the band. Links 14 and 16 are described as top links and bottom links, respectively, for the sake of convenience in reference, but it will be understood that the relation can be reversed whereby links 16 are the top links of the band and links 14 are the bottom links thereof. As hereinafter more particularly described, links 14 are pivotally connected at their opposite ends to the adjacent ends of adjacent links 16 and at their pivotal connections are provided with spring means, hereinafter to be detailed, which hold the links in the band-contracting relation illustrated in Fig. 1 but which permit the links to be moved to band-expanding relation illustrated in Fig. 4. It will be understood that links 14 and 16 are preferably formed of sheet metal.

Each link 14 comprises an outer or shell-like link member 18 and an inner link member 20 which fits easily, but not loosely, into link member 18. Said link member 20 is provided near its opposite ends with circular openings 22 and with integral prongs 24 which are initially formed as illustrated in Fig. 8 and which are bent over the body portion of said link member to occupy the positions illustrated in Fig. 6. When link member 20 is assembled with link member 18 edge portions 26 of outer link member 18 are bent over the outer surface of companion inner link member 20, thereby to secure these companion link members together.

Each link 16 comprises an outer or shell-like link member 28 and a companion inner link member 30 which fits easily, but not loosely, into link member 28. Inner link member comprises a body portion 32 having a portion thereof provided with a recess 34 therein defined by a peripherally extending lip 36, which is at the bottom of said link member when the latter forms part of the bottom link. Tubular projections or pivot pins 38 which project transversely of link member 30 are hollow and, as here shown, are formed integrally with body portion 32 adjacent the opposite ends thereof and the openings 40 of said tubular portions communicate with said recess 34. When companion link members 28 and 30 are assembled, portions 42 of outer link member 28 are bent over the outer surface of inner link member 30 between the tubular portions 38 of said last mentioned link member for holding these link members in assembled relation.

Shells 28 are shaped so that they can be close to each other when the bracelet is in the contracted condition. For this purpose, said shells and the companion inner link members, fitted therein, are preferably shaped as illustrated in Figs. 2 and 13, respectively. More particularly, it will be noted that shell 28 is defined by a straight line 29 and by an arcuate end portion 29a at each side thereof but in reversed relation at opposite sides, respectively, of said shell. By reference to Fig. 13, it will be observed that inner link member 30 is similarly shaped so as to fit into the companion shell 28. Shell 18 and inner link member 20 are defined at their edges by straight parallel lines connected by arcuate lines at the opposite ends of said members as clearly shown in Figs. 1, 6 and 10. As thus shaped, the links are enabled to lie close to each other and also permit simplification of the dies for forming the link members from flat sheet-metal stock.

In assembling links 14 and 16, the tubular pivot pins 38 of link member 30 of link 16 is projected through the opening 22 at the adjacent end of inner link member 20 of link 14, and the outer end portion 44 of pivot pin 38 is upset over the inner surface of inner link member 20 for holding said link members 20 and 28 against separation from each other. It will be understood that pivot pins 38 constitute means for pivotally connecting the links to each other. Said pivot pins 38 also constitute means for holding in position the springs 46 which resiliently hold links 14 and 16 in bracelet or band-contracted condition and which resiliently oppose but permit the relative movement of said links in bracelet-expanding relation. One end 48 of each spring extends into recess 34 of inner link member 30 and abuts the inner surface of lip 36, as clearly shown in Fig. 14, while the opposite ends 50 of said springs are disposed at the inner surface of companion inner link member 20 and are held in position by prongs 24 of said link member 20, as clearly illustrated in Fig. 5. After the inner link members 20 and 28 are thus assembled with each other and with springs 46, the companion outer or shell-like link members are attached to said inner link members, respectively. It will be noted by reference to Fig. 3 that there is a space between the confronting surfaces of links 14 and 16 and more particularly between the inner link members 20 and 28 and it will be understood that the latter have a slight relative movement provided by a somewhat loose fit of tubular pivot pins 38 in companion openings 22, so that the band can be curved around the wrist of the wearer.

While we have shown and described the preferred embodiment of the invention it will be understood that the latter may be embodied in other suitable forms and that in the illustrated form certain changes in details of construction and in the arrangement of parts may be made without departing from the spirit of the invention. Therefore, we do not wish to be limited to the construction herein specifically shown or described except to the extent which may be required by the scope of the appended claims.

Having thus described our invention what we claim and desire to secure by Letters Patent is:

1. An expansible chain for an article of personal wear comprising a series of links pivotally connected to each other only at points adjacent the ends thereof, alternate links of said series of links comprising members each provided with a pair of openings therein near its opposite ends and the intervening links between said alternate links comprising members each provided near its opposite ends with a pair of integral tubular pivot pins which pivotally engage adjacent ends, respectively, of adjacent pairs of said alternate links in said openings therein whereby all of said links are pivotally connected to each other in series, said pair of tubular pivot pins projecting in spaced relation from one side of the link member and the opposite side of the latter having a recess therein in which the adjacent ends of the openings of said pair of pivot pins terminate, and a pair of helical springs positioned in each pair of tubular pivot pins, respectively, co-axially therewith, the adjacent ends of each pair of springs engaging the two alternate links, respectively, which are engaged by the companion pair of pivot pins, and the other adjacent ends of the pair of helical springs engaging the companion intervening link member in said recess for resiliently opposing the relative movement of the adjacent links, respectively, of the chain in chain-expanding relation.

2. An expansible chain for an article of personal wear comprising a series of links pivotally connected to each other only at points adjacent the ends thereof, alternate links of said series of links comprising inner members each provided with a pair of openings therein near its opposite ends and the intervening links between said alternate links comprising inner members each provided near its opposite ends with a pair of integral tubular pivot pins which pivotally engage adjacent ends, respectively, of adjacent pairs of said alternate links in said openings therein whereby all of said links are pivotally connected to each other in series, and helical springs positioned in said tubular pivot pins axially thereof, respectively, said springs having their opposite ends in engagement with companion pivotally connected links, respectively, for resiliently opposing relative movement of said links in chain-expanding direction, said inner members of said alternate links being flat and having bent portions which are engaged by the adjacent ends, respectively, of companion springs.

3. An expansible chain for an article of personal wear comprising a series of links pivotally connected to each other only at points adjacent the ends thereof, alternate links of said series of links comprising members each provided with a pair of openings therein near its opposite ends and the intervening links between said alternate links comprising members each provided near its opposite ends with a pair of integral tubular pivot pins which pivotally engage adjacent ends, respectively, of adjacent pairs of said alternate links in said openings therein whereby all of said links are pivotally connected to each other in series, and helical springs positioned in said tubular pivot pins axially thereof, respectively, said springs having their opposite ends in engagement with companion pivotally connected links, respectively, for resiliently opposing relative movement of said links in chain-expanding direction, said alternate links having portions thereof bent over the adjacent ends, respectively, of companion springs for holding said ends of the companion springs in position, and said intervening links each having a recess in which the other ends, respectively, of a pair of the companion springs are positioned in said engagement with said intervening links.

4. An expansible chain for an article of personal wear comprising a series of links pivotally connected to each other only at points adjacent the ends thereof, alternate links of said series of links comprising members each provided with a pair of openings therein near its opposite ends and the intervening links between said alternate links comprising members each provided near its opposite ends with a pair of integral tubular pivot pins which pivotally engage adjacent ends, respectively, of adjacent pairs of said alternate links in said openings therein whereby all of said links are pivotally connected to each other in series, and helical springs positioned in said tubular pivot pins axially thereof, respectively, said springs having their opposite ends in engagement with companion pivotally connected links, respectively, for resiliently opposing relative movement of said links in chain-expanding direction, said alternate links having portions thereof bent over the adjacent ends, respectively, of companion springs for holding said ends of the companion springs in position, said intervening links having recesses in which the other ends, respectively, of the companion springs are positioned in said engagement with said intervening links, and an outer link member connected to each of said pivotally connected link members and covering the same and the adjacent ends of said springs.

5. An expansible bracelet or wrist watch band comprising an expansible chain formed of a series of links pivotally connected to each other only at points adjacent the ends thereof, and spring means connected to adjacent links at said ends thereof for resiliently opposing the relative movement of the adjacent links, respectively, of the chain in chain-expanding relation, the adjacent end portions of alternate links overlapping the adjacent end portions of adjacent intermediate links, respectively, in surface to surface relation, said alternate links being inclined lengthwise thereof to the longitudinal line of the band and the intermediate links extending lengthwise thereof transversely of said longitudinal line of the band substantially at right angles thereto in the substantially contracted condition of said band.

6. An expansible bracelet or wrist watch band comprising an expansible chain formed of a series of links pivotally connected to each other only at points adjacent the ends thereof, and spring means connected to adjacent links at said ends thereof for resiliently opposing the relative movement of the adjacent links, respectively, of the chain in chain-expanding relation, the adjacent end portions of alternate links overlapping the adjacent end portions of adjacent intermediate links, respectively, in surface to surface relation, said alternate links being inclined lengthwise thereof to the longitudinal line of the band and the intermediate links extending lengthwise thereof transversely of said longitudinal line of the band substantially at right angles thereto in the substantially contracted condition of said band, the surface of each of said intermediate links adjacent the overlapping surfaces of two of said alternate links being substantially covered by the adjacent overlapping end portions of the two adjacent alternate links in the contracted and partially expanded condition of said band.

ANDREW SZEGLIN.
JACQUES KREISLER.